US011896023B2

(12) United States Patent
Nakashima et al.

(10) Patent No.: US 11,896,023 B2
(45) Date of Patent: Feb. 13, 2024

(54) HIGH PROTEIN POWDER MIX (71) Applicant: Kellogg Company, Battle Creek, MI (US)

(72) Inventors: Matthew Nakashima, Galesburg, MI (US); Angela Clark, Bellevue, MI (US); Natalie Ja LaRue, Paw Paw, MI (US)

(73) Assignee: KELLOGG COMPANY, Battle Creek, MI (US)

( * ) Notice: Subject to any disclaimer, the term of this patent is extended or adjusted under 35 U.S.C. 154(b) by 303 days.

(21) Appl. No.: 17/283,736

(22) PCT Filed: Oct. 10, 2019

(86) PCT No.: PCT/US2019/055673
§ 371 (c)(1),
(2) Date: Apr. 8, 2021

(87) PCT Pub. No.: WO2020/077109
PCT Pub. Date: Apr. 16, 2020

(65) Prior Publication Data
US 2021/0378255 A1    Dec. 9, 2021

Related U.S. Application Data (60) Provisional application No. 62/744,292, filed on Oct. 11, 2018.

(51) Int. Cl.
A23C 21/04    (2006.01)
A23C 21/08    (2006.01)
(Continued)

(52) U.S. Cl.
CPC .............. A23C 21/04 (2013.01); A23C 21/08 (2013.01); A23C 21/10 (2013.01); A23J 3/08 (2013.01); A23L 2/395 (2013.01)

(58) Field of Classification Search
CPC ......... A23C 21/04; A23C 21/08; A23C 21/10; A23J 3/08; A23L 2/395
(Continued)

(56) References Cited

U.S. PATENT DOCUMENTS 4,289,788 A    9/1981    Cajigas
4,289,789 A    9/1981    Cajigas
(Continued)

FOREIGN PATENT DOCUMENTS

CN    106359651    2/2017
WO    1998057550    12/1998
WO    2013163659 A1    10/2013

OTHER PUBLICATIONS

PCTUS2019/055673 International Search Report dated Jan. 23, 2020.
(Continued)

Primary Examiner — Brent T O'Hern
(74) Attorney, Agent, or Firm — Honigman LLP (57) ABSTRACT The present disclosure provides for a high-protein, powdered food composition that can be reconstituted into a creamy, yogurt-like, or smoothie-style food having optional inclusions and that delivers the taste, organoleptic characteristics, mouthfeel, and nutritional benefits of conventional ready-to-eat cereal products. In one approach, the food composition or powdered food composition includes a synergistic combination of two or three distinct whey protein powders.

15 Claims, 2 Drawing Sheets (51) Int. Cl.
  *A23C 21/10* (2006.01)
  *A23J 3/08* (2006.01)
  *A23L 2/395* (2006.01)

(58) Field of Classification Search
  USPC .......................................................... 426/580
  See application file for complete search history.

(56) References Cited

U.S. PATENT DOCUMENTS

| | | | |
|---|---|---|---|
| 4,624,853 A * | 11/1986 | Rudin | A23C 9/1232 |
| | | | 426/583 |
| 5,145,697 A | 9/1992 | Cajigas | |
| 2011/0159165 A1 | 6/2011 | Nair et al. | |
| 2014/0287126 A1 | 9/2014 | Bauer et al. | |
| 2015/0189895 A1 | 7/2015 | Christiansen et al. | |
| 2017/0172196 A1 | 6/2017 | Gupta et al. | |
| 2017/0318828 A1 * | 11/2017 | Jensen | A23C 21/026 |

OTHER PUBLICATIONS

Food Technology, Ingredients for Beverages; Institute of Food Technologists, Chicago, IL, US, vol. 49, No. 9, Sep. 1, 1995, pp. 84, 86-93, XP000530191, ISSN 0015-6639.

* cited by examiner

HIGH PROTEIN POWDER MIX

CROSS-REFERENCE TO RELATED APPLICATIONS

This application is a National Stage Application and claims priority under 35 U.S.C. § 371 to Patent Cooperation Treaty application PCT/US2019/055673, filed Oct. 10, 2019, which claims the benefit of and priority under 35 U.S.C. § 119(e) to U.S. Provisional Application No. 62/744,292, filed Oct. 11, 2018. Priority is claimed to both of these applications and the disclosures of these prior applications are considered part of the disclosure of this application, and to the extent allowed, the entire contents of the aforementioned applications are incorporated herein.

FIELD

The present disclosure relates generally to powdered food products and, more particularly, to powdered food products containing high levels of proteins that can be reconstituted into a creamy smoothie-style food. In some approaches, the creamy smoothie-style food may be further mixed with other inclusions including, but not limited to, fruit, rice, nuts, seeds, grains, granola, combinations thereof, and the like.

BACKGROUND

There is growing consumer demand for highly convenient breakfast foods that deliver both high taste and nutritional benefits. On the go lifestyles, such as those eating away from home or eating at work during meal times, make ready-to-serve options very appealing. Additionally, consumers prefer foods and snacks that deliver good taste and nutrition with ease of preparation, lack of mess, and easy clean-up when done eating.

Delivering great taste attributes is often associated with time consuming preparation steps such as cutting, mixing, blending and cooking fresh foods to deliver the right balance of desirable flavor and texture experiences. Many separate ingredients, carefully measured, are often needed or perceived to be needed in order to deliver the desired end experience and organoleptic characteristics. These can include creamy food bases, fruit pieces, nuts, clusters, protein powder, added flavor, or farinaceous-type materials to suggest but a few examples.

To mimic the ready-to-eat, creamy-style smoothie products, it would be advantageous to have a creamy, dairy-like consistency instantly without the actual need for added dairy components that would require refrigeration. Consumers often prefer the ability to mix and coat their food items with a flavorful, creamy base material tending to provide a heightened sensory experience. The ability of a food or snack to quickly achieve a desired creamy texture with, in some instances, minimal effort and without the need of added dairy components, and/or with an extended time where the food retains its desirable taste attributes is highly desirable.

One option for ease of preparation may be through use of powdered foods because powdered materials, which can be reconstituted, is often preferred for convenience. However, a problem attempting to mimic ready-to-eat, mixed creamy foods using consumer-reconstituted powdered materials, in some instances, is that the needed level of an added liquid, such as water, to achieve an instant desirable, creamy texture can be difficult to achieve with minimal mixing to reconstitute the powdered materials. There is a tradeoff where the amount of liquid is very important to the end result, but the amount to add is not readily apparent. This can lead to a trial and error approach by the consumer that is not consistent with the desire for convenient, high taste breakfast foods. It would be advantageous to have a liquid addition approach that easily reconstitutes the powder with minimal mixing.

Another problem with powdered materials is the challenge with evenly hydrating or reconstituting the powders. High protein mixes tend to problematic when reconstituting. Dairy proteins are widely used in a large number of food preparations, often as an emulsifier, a texturizing agent, or as a nutritional supplement to suggest a few applications. Dairy proteins tend to be problematic in powdered mixes in that uniform reconstitution can pose challenging and, often, the higher the protein levels, the more challenging it becomes to achieve an easily hydrated food that is smooth and creamy. Consumers typically expect powder mixes to be immediately dispersible in a liquid with minimal mixing.

Whey proteins are one type of dairy protein often used in food powders and mixes. Unfortunately, the higher the whey protein level in the mixture, the more challenging it becomes to properly hydrate the high protein powders because, in general, the protein powder is more hydrophilic and rewets too quickly on the surface. In many circumstances, a high protein powder is difficult to wet and disperse in fluids due to the high protein powder remaining on the surface of the liquid forming visible lumps during mixing. When protein levels are greater than 50 percent in a powder mix, the problems of protein dispersability are enhanced to a greater extent.

SUMMARY

In one aspect, a high-protein powdered food mix capable of being reconstituted to a smoothie-type viscosity with one or more fluids is described in this disclosure. In some approaches, the powdered food mix includes about 50 weight percent or more of protein provided by a whey protein blend of at least two distinct whey protein powders; a non-dairy creamer powder; a hydrocolloid powder system; vegetable and/or fruit powder as dispersibility aids; and minerals selected from one or more of calcium, potassium, magnesium, iron, phosphorus, or combinations thereof provided by at least one or more of the protein blend, the non-dairy creamer powder, the hydrocolloid powder system, or the vegetable/fruit powder.

In other aspects or embodiments, the high-protein powdered food mix of the previous paragraph may be combined with one or more optional features in any combination thereof. These optional features include: wherein the whey protein blend includes at least two of an agglomerated whey protein powder, an acidified whey protein powder, and a high-fat whey protein powder; and/or wherein the whey protein blend includes an agglomerated whey protein powder combined with an acidified whey protein powder and/or a high-fat whey protein powder; and/or wherein the agglomerated whey protein powder is agglomerated whey protein particles having an agglomerate size of about 0.4 to about 630 microns; and/or wherein the agglomerated whey protein powder has about 90 weight percent or greater whey protein; and/or wherein the acidified whey protein powder has a pH of about 3 to about 5; and/or wherein the acidified whey protein powder has about 70 to about 85 weight percent whey protein; and/or wherein the high-fat whey protein powder has about 10 to about 15 percent fat; and/or wherein the high-fat whey protein powder has about 60 to about 80 percent whey protein; and/or wherein the whey protein blend includes 40 to about 70 weight percent of the agglomerated whey protein powder, about 20 to about 40 weight percent of the high-fat whey protein powder, and about 0 to about 25 weight percent of the acidified whey protein powder; and/or wherein whey protein blend includes an excess of the agglomerated whey protein powder relative to one or both of the acidified whey protein powder and to the high-fat whey protein powder; and/or wherein a whey ratio of the agglomerated whey protein powder to the sum of the acidified whey protein powder and the high-fat whey protein powder is about 1:1 to about 2:1, preferably 1:1 to about 1:5:1, more preferably, about 1.2:1; and/or wherein the powdered mix include about 2 to about 5 weight percent of the hydrocolloid powder system; and/or wherein the hydrocolloid powder system includes a blend of two carrageenan powdered gums; and/or wherein the hydrocolloid powder systems includes a blend of kappa carrageenan and iota carrageenan; and/or wherein the hydrocolloid powder system includes about 1.5 to about 6 times more of the kappa carrageenan than the iota carrageenan; and/or wherein the vegetable powder is a mushroom powder; and/or wherein the powdered mix includes no more than about 1 weight percent of the vegetable powder; and/or wherein the mushroom powder has a particle size of 120 mesh or below; and/or wherein powdered mix includes about 3 to about 6 weight percent of the non-dairy creamer powder, preferably about 4 to about 5 weight percent; and/or wherein about 30 to about 40 grams of the powdered mix, when reconstituted with about 60 to about 150 ml of water, forms a smoothie-like consistency having a viscosity of about 10 to about 4,000,000 cPs; and/or further comprising a pectin-containing fruit powder; and/or wherein the powdered mix include about 8 to about 12 percent of the pectin-containing fruit powder; and/or wherein the powdered mix includes about 10 to about 20 mg/g of calcium and about 0.1 to about 2 mg/gram of magnesium provided by one or more of the protein blend, the hydrocolloid system, or the non-dairy creamer; and/or wherein the high-protein powdered food mix is non-fortified.

In yet other aspects of this disclosure, a packaged food product is described wherein the product includes the powdered mix as described in either of the two previous paragraphs. In some approaches, this powdered mix is provided in a first sealed compartment. In other approaches, the packaged food product also includes a second sealed compartment containing non-powdered components. The non-powdered components may be selected from clusters, toasted ingredients, puffed or popped ingredients, flakes, nuts, fruit pieces, seeds, granola, rice, oats, and mixtures thereof. In some approaches, the second sealed compartment is removably contained within the first sealed compartment.

DETAILED DESCRIPTION

The present disclosure provides a high-protein, powdered food composition that can be hydrated or reconstituted into a creamy, yogurt-like, or smoothie-style food having optional inclusions mixed therewith and that delivers the taste, organoleptic characteristics, mouthfeel, and nutritional benefits of conventional ready-to-eat, smoothie-style products. In one aspect, the high-protein, powdered food composition includes a unique blend of two and, preferably, three distinct types of whey protein powders that demonstrate a synergistic effect with respect to powder hydration when utilized in a high-protein powder composition or dry mix. Thus, the powdered food compositions herein, due to the synergistic blend of whey proteins, can provide high levels of dairy protein in an easily reconstituted or hydrated composition. To this end, the powdered compositions herein include about 50 weight percent or more dairy protein (in other approaches, about 50 to about 75 weight percent dairy protein, and in other approaches, about 50 to about 60 weight percent dairy protein) and can still be reconstituted by hand mixing with fluids (such as water) to form a creamy and smooth food.

In another aspect, the high-protein, powdered food compositions herein include the synergistic whey protein powdered blend combined with a hydrocolloid powder system and/or an optional vegetable or fruit powder dispersibility aid. The hydrocolloid system and/or optional vegetable and/or fruit powder dispersibility aid tend to complement the synergistic whey protein blend and aid in the uniform hydration or dispersion of the high-protein powders. In one approach, the hydrocolloid powder systems includes a blend of carrageenan powders, and in some approaches a blend of kappa-carrageenan and iota carrageenan. In other approaches, the vegetable or fruit powder dispersibility aid has a particle size of 120 mesh or below and, in some approaches, is a mushroom powder and/or a pectin-containing fruit powder having a select particle size.

In yet other aspects, the powdered food compositions herein are not-fortified yet still provide high levels of minerals from a purposeful section of multi-functional ingredients that can supply the needed minerals without additional or supplemental fortification. Minerals include calcium, potassium, magnesium, iron, phosphorus, or combinations thereof. Preferably, minerals include calcium, magnesium, and combinations thereof that are provided by one or more of the ingredients in the powdered food composition.

The compositions herein, in other approaches, provide a complete snack or snack kit that delivers a hand-holdable, on-the-go package sized food composition to fit easily within a backpack, purse or briefcase that provides a controlled method for adding the correct amount of liquid to the mix material where the powdered food composition instantly develops a creamy consistency.

Turning to more of the specifics, the high-protein, powdered food composition is a dry powder mix (that is, moisture levels less than about 1 weight percent, in other approaches, less than about 0.5 weight percent) that can be hydrated or reconstituted with fluids as a combined mass into a creamy, yogurt-like, or smoothie-type food. The high-protein, powdered food composition, in one approach or embodiment, includes about 50 weight percent or more protein provided by at least a unique whey protein blend of at least two and preferably three distinct whey protein powders; a hydrocolloid powder system that preferably includes a blend of two distinct carrageenan gums, a non-dairy creamer powder, and optionally a vegetable or fruit powder dispersability aid (preferably a pectin-containing fruit powder and/or a mushroom powder). Each component will be described more fully below.

Synergistic Whey Protein Powder Blend:

The whey protein powder blend includes a synergistic mix of two to three distinct whey protein powders. In one approach, the distinct whey protein powders include at least an agglomerated whey protein powder combined with one or both of an acidified whey protein powder and/or a high-fat whey protein powder. In another approach, the distinct whey protein powders in this synergistic blend include the agglomerated whey protein powder combined with the high fat whey protein powder. In yet other approaches, the distinct whey protein blend includes all three powders: the agglomerated whey protein powder, the high fat whey protein powder, and the acidified whey protein powder. The high-protein powdered food composition includes about 30 to about 50 weight percent of the whey blend, (that is, all two or three whey powders), and in other approaches, about 30 to about 40 weight percent of this whey blend.

The agglomerated whey protein powder, in some approaches, is an instantized or agglomerated whey protein including whey protein particles having an agglomerate size of about 0.4 microns to about 630 microns. The agglomerated whey protein powder has about 90 weight percent or greater whey protein (preferably, about 90 to about 95 weight percent whey protein), a pH of about 6 to about 7, and fat, but only about 1 weight percent or less fat. In some approaches, the powdered food composition includes about 15 to about 25 weight percent of the agglomerated whey protein powder, in other approaches, about 15 to about 20 weight percent. Within the synergistic whey protein blend, the agglomerated whey protein powder is the largest component of the blend where the whey blend may include about 40 to about 70 weight percent of the agglomerated whey protein powder, and in other approaches, about 45 to about 55 weight percent of the agglomerated whey protein powder. In some approaches, the agglomerated whey protein powder is an agglomerated whey protein isolate powder.

The acidified whey protein powder is a whey protein powder treated to have a lower acidity that the other protein powders. In some approaches, the acidified whey protein powder has a pH of about 3 to about 5. The acidified whey protein powder has about 70 to about 85 weight percent whey protein and fat but about 1 weight percent or less fat. In some approaches, the acidified whey protein powder has a particle size of about 0.4 to about 630 microns. This whey protein powder is optional, but preferred in the synergistic blend. In some approaches, the powdered food composition includes about 0 to about 15 weight percent of the acidified whey protein powder, in other approaches, about 5 to about 15 weight percent, and in yet other approaches, about 5 to about 10 weight percent. Within the synergistic whey protein blend, the acidified whey protein powder provides about 0 to about 25 weight percent of the synergistic blend, and in other approaches, about 15 to about 25 weight percent of the synergistic blend, and in yet other approaches, about 15 to about 20 weight percent of this blend. In some approaches, the acidified whey protein powder is an acidified whey protein isolate powder.

The high-fat whey protein powder is the third distant type of whey in the synergistic blend and includes higher levels of fat than the other two components. For instance and in some approaches, this whey protein powder has about 10 to about 15 percent fat, in other approaches, about 10 to about 13 percent fat. This whey protein powder also has at least about 60 weight percent whey protein and, in some instances, about 60 to about 80 weight percent whey protein and, in other instances, about 70 to about 80 weight percent whey protein. The high-fat whey protein powder also has a pH of about 6 to about 7. In other approaches, the high-fat whey protein powder has a particle size of about 0.4 to about 630 microns. In some approaches, the powdered food composition includes about 5 to about 15 weight percent of the high-fat whey protein powder, in other approaches, about 6 to about 11 weight percent. Within the synergistic whey protein blend, the high-fat whey protein powder provides about 20 to about 40 weight percent of the synergistic blend, and in other approaches, about 20 to about 30 weight percent of the synergistic blend. In some approaches, the high-fat whey protein powder is a high-fat whey protein concentrate.

In some approaches, this whey protein powder synergistic blend is a mix of at least the agglomerated whey protein powder and the high fat whey protein powder. The acidified whey protein powder is optional, but preferably included in the blend. For example, the synergistic blend may include, based only the blend of the three whey powders, about 40 to about 70 weight percent of the agglomerated whey protein powder, about 20 to about 40 weight percent of the high-fat whey protein powder, and about 0 to about 25 weight percent of the acidified whey protein powder (preferably, about 15 to about 25 weight percent of the acidified whey protein powder). In other approaches, the synergistic whey protein blend includes an excess of the agglomerated whey protein powder relative to a sum of the optional acidified whey protein powder and the high-fat whey protein powder. In yet other approaches, a whey ratio of the agglomerated whey protein powder to the sum of the acidified whey protein powder and the high-fat whey protein powder is about 1:1 to about 2:1, preferably 1:1 to about 1:5:1, more preferably, about 1.2:1. This unique blend of the two to three distinct whey protein powders was found advantageous in achieving uniform and rapid hydration of a high protein powdered mix.

Hydrocolloid System

The powdered food compositions herein also preferably include a hydrocolloid system that, in some approaches, includes gums, starches, or combinations thereof. In other approaches, the hydrocolloid system is a blend of two carrageenan gums. In one aspect, the blend is selected from a mixture of a kappa-carrageenan and iota carrageenan. In some approaches, the powdered food composition includes about 2 to about 5 weight percent of the hydrocolloid system. In other approaches, the hydrocolloid system includes more of the kappa carrageenan than the iota carrageenan. In yet other approaches, the hydrocolloid system further includes about 1.5 to about 6 times more of the kappa carrageenan than the iota carrageenan.

Dispersibility Aid

In some approaches, the powdered food composition may also include a powder as a further dispersibility aid that optionally aids in uniform hydration and dispersion of the powders. In one approach, the dispersibility aid is a fruit powder, a vegetable powder, or a mix thereof. In other approaches, the dispersibility aid is a pectin-containing fruit powder. In yet other approaches, the dispersibility aid is a mushroom powder. In some approaches, the powdered food composition includes no more than about 1 weight percent of the vegetable powder and about 5 to about 10 percent of the fruit powder. In yet other approaches, these dispersibility aid powders have a small particle size, such as a particle size of about 120 mesh or below. These powders may further provide other features to the mix, such as providing vitamins and minerals. For example, the vegetable powder (and in particular, the mushroom powder) may provide vitamin D.

Non-Dairy Creamer Powder

The creamer portion of the powdered food composition may include non-fat dry milk powder, dairy protein powder, carbohydrates powders from dairy sources, dairy fats and oils, and derivatives thereof. The powdered food composition may include about 1 to about 6 weight percent of creamer powder ingredients, and in other approaches, about 2 to about 5 weight percent. If a non-dairy creamer is used, it may be about 4 to about 5 percent of the composition.

Optional Components of the Powdered Food Composition:

In some approaches, the powdered food composition may also include optional powdered or other optional components. For instance and in some approaches, the powdered food composition may include a fruit powder and, in some approaches, the fruit powder may be a pectin-containing fruit powder such as the fruit powder dispersibility aids discussed above. In some approaches, the powdered food composition may include about 5 to about 15 weight percent of the fruit powder, and in other approaches, about 8 to about 12 weight percent of the fruit powder.

In yet other approaches, the powdered food composition may also include minerals, such as calcium, potassium, magnesium, iron, phosphorus, and combinations thereof. In some approaches, the powdered food composition is not fortified with such minerals, but the minerals are provided through a purposeful selection of components already in the composition. For instance, the powdered food composition may include about 10 to about 20 mg/g of calcium and about 0.1 to about 2 mg/gram of magnesium provided by one or more of the whey protein powder synergistic blend, the hydrocolloid system, the vegetable powder, and/or the non-dairy creamer.

The above described components of the powdered food composition are dry mixed into a uniform powdered mix or powdered composition. In use, the powdered food composition is hydrated or reconstituted by a consumer with a fluid, such as water, into a creamy, smoothie-style food. In one example, about 30 to about 40 grams of the powdered food composition or mix is reconstituted with about 60 to about 150 ml of water to form a smoothie-like consistency having a viscosity of about 10 to about 4,000,000 cPs. The hydrated food composition may have a shear-thinning behavior where viscosity decreases upon increasing shear rate. The powdered food composition is configured to be reconstituted or hydrated with a liquid to produce a creamy food having, once combined therewith, optional crunchy, firm, or non-soggy inclusions therein. The hydration fluid may be water (hot or cold), juices, non-dairy creamer, coffee, cocktails, alcohol, dairy liquids cream, and mixtures thereof.

Non-Powdered Component

In some approaches, the powdered food composition, preferably after being reconstituted with fluid, may be combined with an optional non-powdered component. In some aspects, the powdered food composition and the non-powdered component are kept separate until the powdered food composition is hydrated to a desired texture level or desired level of creaminess. Then, the non-powdered component may be blended or folded into the hydrated food to form a final or blended composition.

In one approach, the non-powder component may include granola, clusters, toasted inclusions, puffed or popped inclusions, flakes, nuts, seeds, larger fruit pieces, and the like and any mixtures thereof. The non-powdered component may include, but is not limited to a cluster ingredient (for instance, clustered, shredded and/or extruded pieces of soy, oat wheat, corn, spelt, rice, ray, wheat, wild rice, tricale, barley, sorghum, millet, or mixtures thereof); toasted ingredients (such as toasted rice, oat, wheat, quinoa, sorghum, corn, millet, or mixtures thereof); puffed or popped ingredients (including wheat, amaranth, quinoa, sorghum, corn, millet, or combinations thereof); flaked ingredients (sorghum, rice, corn, wheat, or mixtures thereof); nut ingredients (tree nuts, soy nuts, edible seeds, fruit nuts, pumpkin seeds, or mixtures thereof); seeds (chia, flax, seas am, sunflower, pepitas, or mixtures thereof); non-powdered or larger fruit pieces; and the like inclusions, and combinations thereof.

In addition to the powder component and the optional, non-powder component, the final food composition may also include other optional components or ingredients. For example, the final food composition may further include a sweetener, such as but not limited to, sugar, sugar syrups, high intensity sweeteners, fruits, fruit syrups, and additional fruit powders. In one approach, the final food composition may include about 6 to about 25 weight percent sweetener. The final food composition may also include tocopherol powder, such as about 0 to about 3 weight percent. Other optional ingredients include flavors and seasonings, such as but not limited to, natural flavors and seasonings, extracts and flavors with other natural flavors (WONFs), other natural flavor types and artificial flavors, sweet and/or savory seasonings, salt, spices, other like ingredients, and mixtures thereof. Optional additives may also include noodles and chocolate pieces. As mentioned above, the optional flavors, seasonings, and the like may account for about 35 to about 55 weight percent of the final food composition. These optional components may be blended with either the powdered food composition or the non-powdered component as needed for each application.

As used herein, the term "taste" generally means an overall consumer acceptance of a food as a result of the combination of the food's organoleptic properties, mouthfeel, and appearance. The term "organoleptic" generally includes the flavor, texture, mouthfeel, smell, and/or sound of a food that are experienced by the consumer of the food when eaten. The phrase "relative taste" or "relative organoleptic score" generally refers to a difference between a sample mean overall taste score of a test product as reported by a panel of trained tasters and the sample mean overall taste score of a reference. In general, the quality of a consumer's eating experience and, thus the effectiveness of a food achieving a desired organoleptic quality (such as duplicating a ready-to-eat creamy food), may be dependent on the food's overall organoleptic properties and visual appeal, which in turn may be dependent on the food's composition, structure, texture, mouthfeel, and/or, in some instances, processing. Although a food's taste qualities may include organoleptic properties and visual appeal, taste, texture, and/or mouthfeel may be generally related to a high consumer liking of a food. These properties may be related to viscosity, pasting level, and Instron performance.

In one approach, the powdered food composition is provided in a container and lid combination or kit. The container may include the powdered food composition including the powder component in a first sealed compartment, the non-powder component in a separate sealed compartment, and other optional ingredients may be included with either the first or the second compartment. The first sealed compartment may include the second sealed compartment in a nested configuration with the second sealed compartment being sealed in the first sealed compartment along with any of the powdered food composition features as described in any paragraph herein.

In some approaches, the first sealed compartment may include a fluid fill line that provides an example of a controlled water addition feature. Thus, in use, a consumer may remove the lid or other seal and then add the desired amount of fluid up to the fill line in the container. Upon low shear mixing (such as hand mixing with a spoon or other common kitchen utensil), the select fluid amount enables the powdered food composition component to instantly or quickly hydrate into a creamy yogurt or smoothie-style food while the non-powder ingredients, when added, remain crunchy, firm, and/or non-soggy. The container may include an optional collapsible spoon or other mixing element detachably mounted therein. Thus, in use, a consumer detaches the spoon, adds fluid to the fill line in the container with the powdered food composition, and mixes with the un-collapsed spoon to achieve the desired consistency. The spoon may then be used to consume the reconstituted food.

The Table below provides exemplary ranges of the various components in the high-protein powdered food composition or mix.

TABLE 1

High-Protein Powdered Food Composition

| Component | Weight Percent |
|---|---|
| Agglomerated Whey Protein Isolate | 15 to 20 |
| Fruit Powder | 5 to 15 |
| High Fat Whey Protein Concentrate | 5 to 15 |
| Acidified Whey Protein Isolate | 0 to 12 |
| Non-Dairy Creamer | 4 to 10 |
| Kappa Carageenan | 2 to 5 |
| Optional Seed Component | 1 to 5 |
| Iota Carrageenan | 0.5 to 2 |
| Vegetable powder | 0.01 to 1 |
| Mixed Tocopherol Concentrate (70%) | 0 to 0.1 |

A better understanding of the present disclosure and its many advantages may be clarified with the following examples. The following examples are illustrative and not limiting thereof in either scope or spirit. Those skilled in the art will readily understand that variations of the components, methods, steps, and devices described in these examples can be used. Unless noted otherwise or apparent from the context of discussion, all percentages, ratios, and parts noted in the Examples and elsewhere in this disclosure are by weight.

EXAMPLES

Example 1

Figure 1:
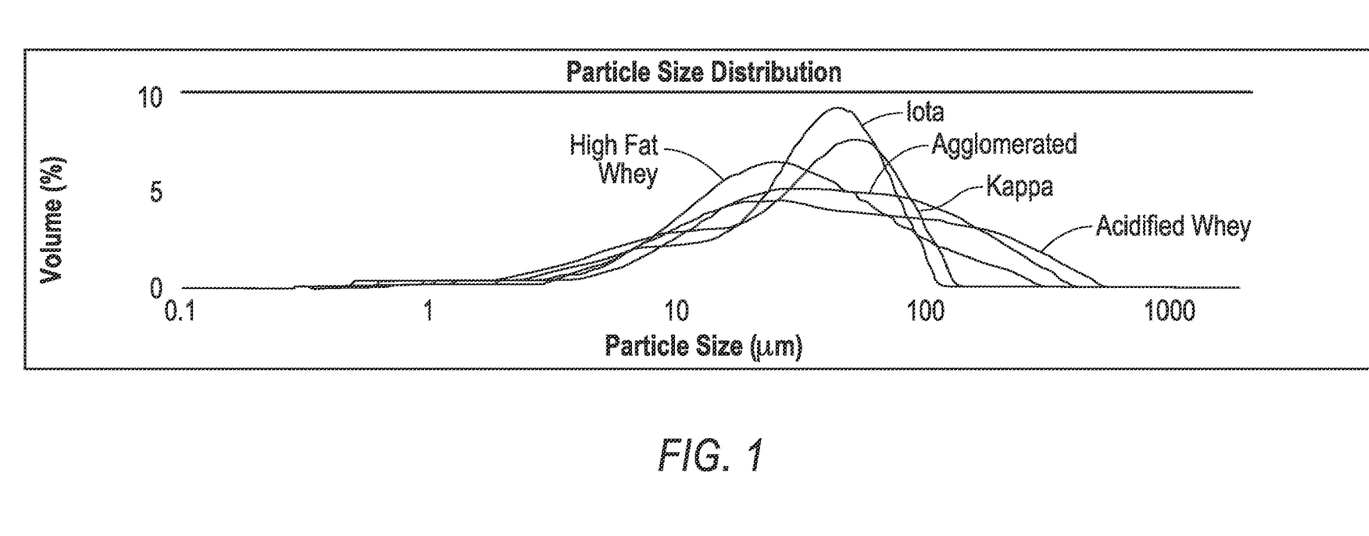
FIG. 1 is a graph of particle size.

An evaluation was conducted on the particle size of various powders used in the compositions herein. Table 1 below and FIG. 1 provide particle size data (microns).

TABLE 1

| Sample # | Sample Name | Surface wt mean D[3, 2] | Volume wt mean D[4, 3] | d(0.1) | d(0.5) | d(0.9) |
|---|---|---|---|---|---|---|
| 1 | Agglomerated Whey Powder | 21.5 | 66.0 | 10.5 | 41.1 | 159.6 |
| 2 | High-Fat Whey Powder | 14.8 | 43.0 | 8.2 | 27.3 | 98.7 |
| 3 | Acidified Whey Powder | 16.3 | 74.0 | 7.7 | 36.7 | 199.9 |
| 4 | Kappa Carrageenan | 10.1 | 38.6 | 5.2 | 33.9 | 80.6 |
| 5 | Iota Carrageenan | 11.6 | 37.1 | 6.4 | 34.8 | 71.1 |

Example 2

Figure 2:
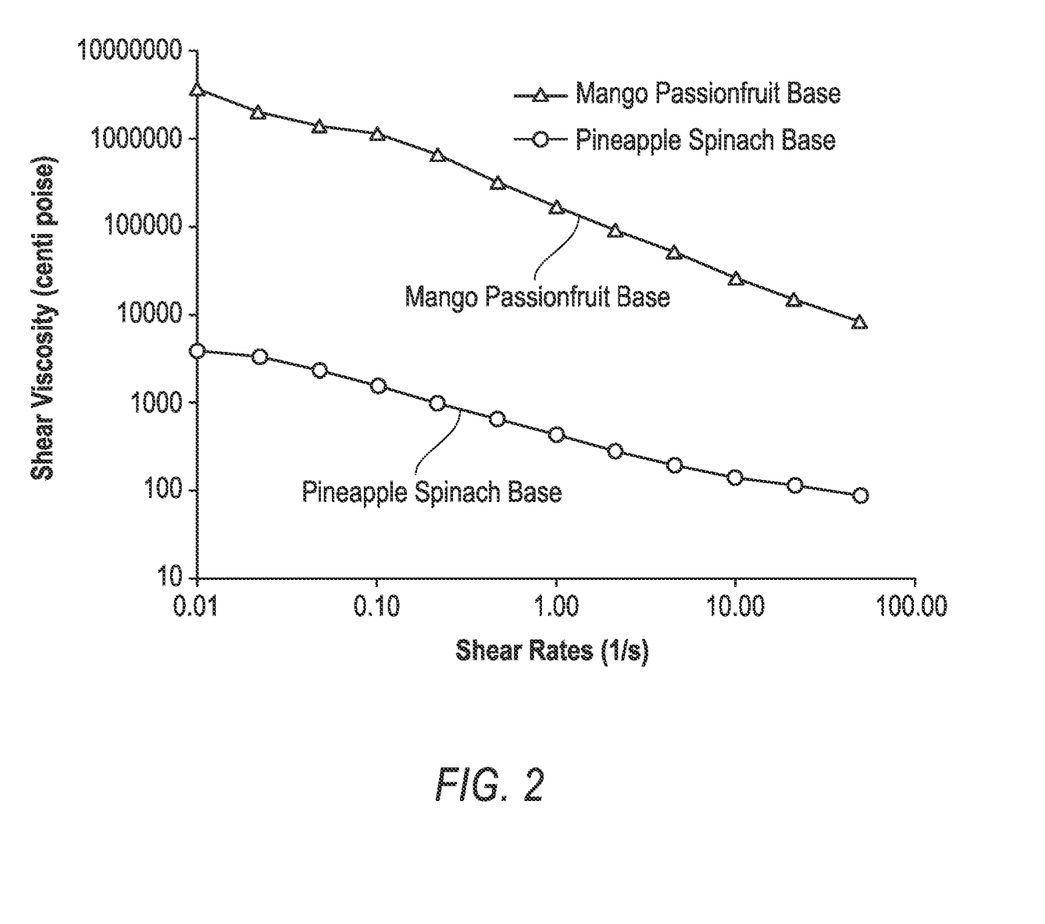
FIG. 2 is a graph of viscosity relative to shear rate.

Two powdered bases were reconstituted with water to measure viscosity. A first sample included mango passionfruit powder flavors and a second sample included pineapple spinach powder flavors. The mango passionfruit sample was hydrated with low levels of water and the pineapple spinach was high levels of water. Each sample demonstrates shear thinning behavior in that the viscosity drops as shear rate increases. The measured viscosity is shown in FIG. 2.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element, layer, ingredient, component is referred to as being "on," "engaged to," "connected to," "attached to," or "coupled to" another element, layer, ingredient, component it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

It is to be understood that each component, compound, substituent or parameter disclosed herein is to be interpreted as being disclosed for use alone or in combination with one or more of each and every other component, compound, substituent or parameter disclosed herein.

It is further understood that each range disclosed herein is to be interpreted as a disclosure of each specific value within the disclosed range that has the same number of significant digits. Thus, for example, a range from 1 to 4 is to be interpreted as an express disclosure of the values 1, 2, 3 and 4 as well as any range of such values.

It is further understood that each lower limit of each range disclosed herein is to be interpreted as disclosed in combination with each upper limit of each range and each specific value within each range disclosed herein for the same component, compounds, substituent or parameter. Thus, this disclosure to be interpreted as a disclosure of all ranges derived by combining each lower limit of each range with each upper limit of each range or with each specific value within each range, or by combining each upper limit of each range with each specific value within each range. That is, it is also further understood that any range between the endpoint values within the broad range is also discussed herein. Thus, a range from 1 to 4 also means a range from 1 to 3, 1 to 2, 2 to 4, 2 to 3, and so forth.

Furthermore, specific amounts/values of a component, compound, substituent or parameter disclosed in the description or an example is to be interpreted as a disclosure of either a lower or an upper limit of a range and thus can be combined with any other lower or upper limit of a range or specific amount/value for the same component, compound, substituent or parameter disclosed elsewhere in the application to form a range for that component, compound, substituent or parameter.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure. Unless otherwise noted, all weights, ratios, and percentages are by weight.

What is claimed is:

1. A high-protein powdered food mix capable of being reconstituted to a smoothie-type viscosity with one or more fluids, the powdered food mix comprising:
   about 50 weight percent or more of protein provided by a whey protein blend including an agglomerated whey protein powder, an acidified whey protein powder, and a high-fat whey protein powder wherein the high-fat whey protein powder has about 10 to about 15 weight percent fat, wherein the whey protein blend includes an excess of the agglomerated whey protein powder relative to one or both of the acidified whey protein powder and to the high-fat whey protein powder, and wherein a whey weight ratio of the agglomerated whey protein powder to the sum of the acidified whey protein powder and the high-fat whey protein powder is about 1:1 to about 2:1;
   a non-dairy creamer powder;
   a hydrocolloid powder system;
   vegetable and/or fruit powder;
   minerals selected from one or more of calcium, potassium, magnesium, iron, phosphorus, or combinations thereof provided by one or more of the whey protein blend, the non-dairy creamer powder, the hydrocolloid powder system, or the vegetable powder;
   wherein a smoothie-type viscosity is about 10 to about 4,000,000 cPs; and
   wherein the one or more fluids are selected from water, juice, non-dairy creamer, coffee, cocktails, alcohol, dairy liquid cream, or mixtures thereof.

2. The high-protein powdered food mix of claim 1, wherein the agglomerated whey protein powder is agglomerated whey protein particles having an agglomerate size of about 0.4 to about 630 microns.

3. The high-protein powdered food mix of claim 2, wherein the agglomerated whey protein powder has about 90 weight percent or greater whey protein.

4. The high-protein powdered food mix of claim 1, wherein the acidified whey protein powder has a pH of about 3 to about 5.

5. The high-protein powdered food mix of claim 4, wherein the acidified whey protein powder has about 70 to about 85 weight percent whey protein.

6. The high-protein powdered food mix of claim 1, wherein the high-fat whey protein powder has about 60 to about 80 weight percent whey protein.

7. The high-protein powdered food mix of claim 1, wherein the whey protein blend includes 40 to about 70 weight percent of the agglomerated whey protein powder, about 20 to about 40 weight percent of the high-fat whey protein powder, and about 15 to about 25 weight percent of the acidified whey protein powder.

8. The high-protein powdered food mix of claim 1, wherein a whey weight ratio of the agglomerated whey protein powder to the sum of the acidified whey protein powder and the high-fat whey protein powder is about 1:1 to about 1:5:1.

9. The high-protein powdered food mix of claim 1, wherein the powdered mix include about 2 to about 5 weight percent of the hydrocolloid powder system.

10. The high-protein powdered food mix of claim 1, wherein the hydrocolloid powder system includes a blend of two carrageenan powdered gums.

11. The high-protein powdered food mix of claim 10, wherein the hydrocolloid powder system includes a blend of kappa carrageenan and iota carrageenan.

12. The high-protein powdered food mix of claim 11, wherein the hydrocolloid powder system includes about 1.5 to about 6 times more of the kappa carrageenan than the iota carrageenan based on weight.

13. The high-protein powdered food mix of claim 1, wherein the powdered food mix includes about 3 to about 6 weight percent of the non-dairy creamer powder.

14. The high-protein powdered food mix of claim 1, wherein about 30 to about 40 grams of the powdered food mix, when reconstituted with about 60 to about 150 ml of water, forms a smoothie-like consistency having a viscosity of about 10 to about 4,000,000 cPs.

15. The high-protein powdered food mix of claim 1, wherein the powdered food mix includes about 10 to about 20 mg/g of calcium and about 0.1 to about 2 mg/gram of magnesium provided by one or more of the whey protein blend, the hydrocolloid powder system, or the non-dairy creamer powder, and wherein the high-protein powdered food mix is non-fortified.

\* \* \* \* \*